United States Patent [19]
Hirano

[11] Patent Number: 5,987,400
[45] Date of Patent: Nov. 16, 1999

[54] SYSTEM FOR MONITORING THE THROUGHPUT PERFORMANCE OF A DISK STORAGE SYSTEM

[75] Inventor: Masakado Hirano, Tokyo, Japan

[73] Assignee: Kabushiki Kaisha Toshiba, Kawasaki, Japan

[21] Appl. No.: 09/069,103

[22] Filed: Apr. 29, 1998

[30] Foreign Application Priority Data

May 8, 1997 [JP] Japan .................................... 9-118192

[51] Int. Cl.[6] .............................. G11B 5/09; G11B 19/02
[52] U.S. Cl. ......................... 702/186; 702/185; 360/53; 360/3
[58] Field of Search .................................. 702/186, 185; 360/53, 3; 714/39, 45, 42

[56] References Cited

U.S. PATENT DOCUMENTS

| | | | |
|---|---|---|---|
| 3,704,363 | 11/1972 | Salmassy et al. | 360/53 |
| 5,121,263 | 6/1992 | Kerwin et al. | 360/53 |
| 5,287,363 | 2/1994 | Wolf et al. | 360/53 |
| 5,450,609 | 9/1995 | Schultz et al. | |
| 5,740,358 | 4/1998 | Geldman et al. | 360/53 |
| 5,761,411 | 6/1998 | Teague et al. | 714/42 |
| 5,828,583 | 10/1998 | Bush et al. | 702/186 |

FOREIGN PATENT DOCUMENTS

| | | |
|---|---|---|
| 3-156635 | 7/1991 | Japan . |
| 4-310671 | 11/1992 | Japan . |

*Primary Examiner*—Marc S. Hoff
*Assistant Examiner*—Hien Vo
*Attorney, Agent, or Firm*—Pillsbury Madison & Sutro LLP

[57] ABSTRACT

In a disk storage drive having a CPU, a disk and an EEPROM, the CPU measures throughput performance. The CPU measures the throughput performance for a measured area provided on a data-recording surface of the disk, in response to a test command supplied from a host system. The measured area consists of three zones designated by a pointer stored in the EPROM. The CPU stores the throughput performance measured for the measured area, into the EEPROM, and updates the pointer so that the CPU may measure the throughput performance for the next measured area provided on the data-recording surface.

16 Claims, 6 Drawing Sheets

SYSTEM FOR MONITORING THE THROUGHPUT PERFORMANCE OF A DISK STORAGE SYSTEM

BACKGROUND OF THE INVENTION

The present invention relates to a system for monitoring data related to disk storage drive performance. More particularly, the invention relates to a system which measures the throughput performance of a disk storage drive.

In recent years, hard disk drives (HDDs) have been developed which can predict HDD errors. These HDDs monitor various performance criteria, including the number of times the HDD motor has been started and stopped, and the length of time the HDD has had a supply of electric power. As a result, most HDDs can notify a host system, such as a personal computer, regarding potential HDD errors.

Another performance criterion that is commonly monitored in an HDD is throughput performance. Throughput performance is defined as the time the HDD requires to read data from the data-recording surface of the disk. The CPU incorporated in the HDD compares the time spent to read data from the data-recording surface of the disk (the "actual throughput performance") with a reference time (the "theoretical throughput performance"). The overall performance of the HDD over a period of time can be determined by monitoring the difference between actual throughput performance and theoretical throughput performance.

The time required to read data from the HDD may vary depending on several factors, including: (1) the seek operation, in which the read/write head of the HDD moves to a target position in the disk; and (2) the number of times the head attempts to read data from the disk, which in turn, may be affected by the presence of defects on the data-recording surface of the disk. The lower the speed of the seek operation, or the greater the number of data-reading attempts, the longer the time the HDD requires to read data from the disk.

The present way of measuring throughput performance is time-consuming because the entire data-recording surface of the disk has to be read before the throughput performance can be measured. In order to shorten the time for measuring throughput performance, one may read only a part of the data-recording surface of the disk. However, defects in other parts of the data-recording surface will not be reflected in such a measurement. Thus, there is a need for a system that measures throughput performance efficiently and accurately.

BRIEF SUMMARY OF THE INVENTION

The object of the present invention is to provide a system for monitoring the throughput performance of a disk storage drive, in which each data-recording surface of the disk is divided into a plurality of areas. The throughput performance is measured for each subdivided area thus requiring less time to measure. As a result, the system measures the throughput performance for the entire data-recording surface effectively and efficiently.

To attain the object, a system according to the invention comprises: pointer means for storing a pointer designating one of measured areas provided on the data-recording surface of the disk, for which the throughput performance is to be measured; measuring means for measuring the throughput performance for the measured area designated by the pointer stored in the pointer means; storing means for storing the throughput performance measured for the measured area by the measuring means; and management means for updating the pointer every time the measuring means measures throughput performance, thereby to designate measured areas sequentially until throughput performance is measured for the entire data-recording surface of the disk.

In this system, the throughput performance is measured for the area designated by the pointer stored in the pointer means, in response to a specific command (i.e., a test command) supplied from a host system. Then, the pointer is updated, thereby designating the next area, whereby the throughput performance is measured for this area. Thereafter, the throughput performance is measured for the remaining areas. In this manner, the throughput performance is measured for the entire data-recording surface of the disk.

The throughput performance is measured for each area more quickly because the area is small. Since the throughput performance measured for each area is stored into the storing means, the measuring process can be interrupted in response to a read/write access command supplied by the host system. After the read/write command, measuring the throughput performance may resume. In this way, throughput performance can be measured even though the disk remains accessible to commands from the host system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
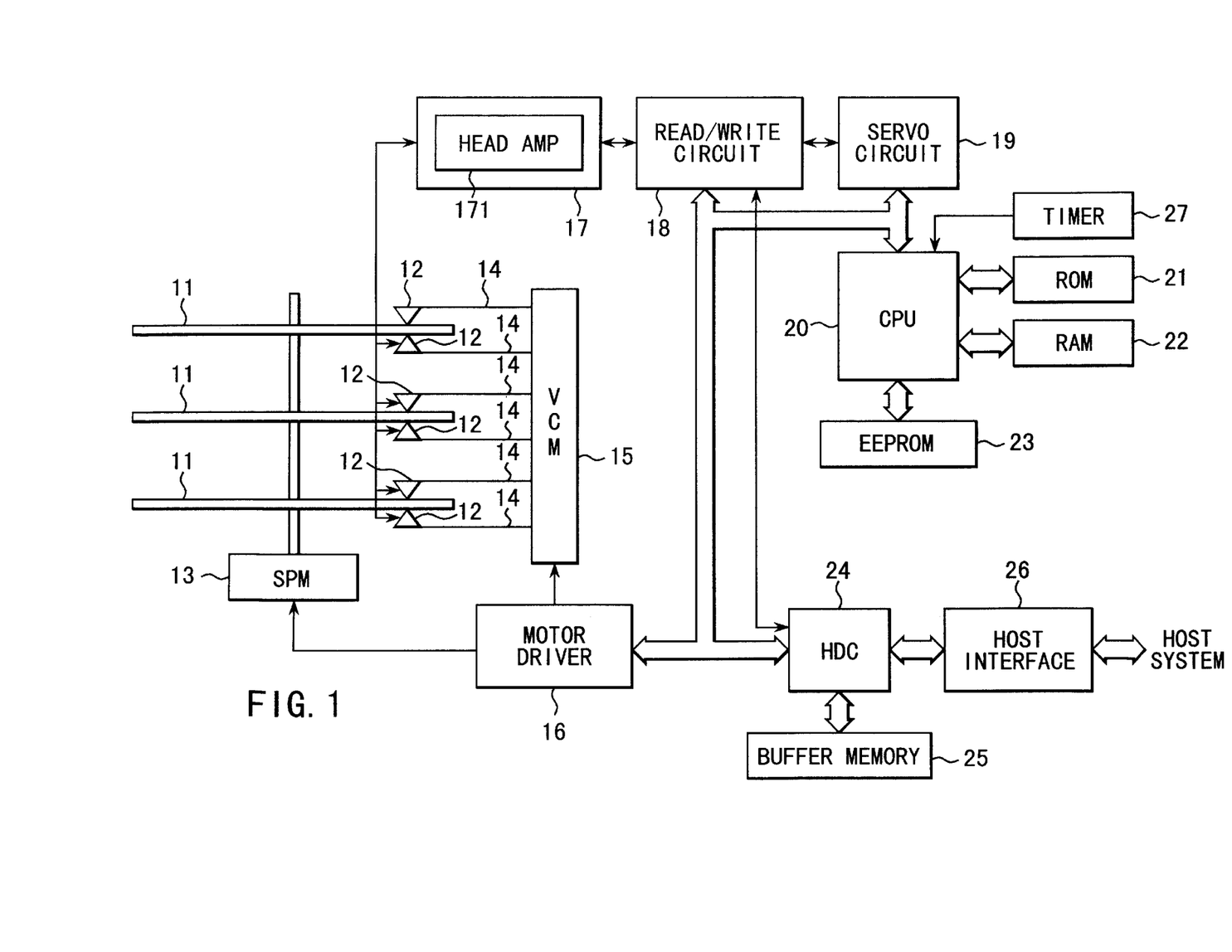
FIG. 1 is a block diagram showing the HDD incorporating a system according to the invention.

An embodiment of the present invention will be described, with reference to the accompanying drawings. (Structure of the HDD) The embodiment is a system measuring the throughput performance of a hard disk drive (HDD) which is a disk storage drive. As shown in FIG. 1, the HDD has three disks 11 and six heads 12. The disks 11, which are used as storage media, are located one above another. Each disk 11 has two data-recording surfaces. Two heads 12 are provided for each disk 11, one for writing data on and reading data from one data-recording surface of the disk 11 and the other for writing data on and reading data from the other data-recording surface of the disk 11. Serial numbers 0 to 5 are assigned to the six heads 12, respectively.

Figure 2:
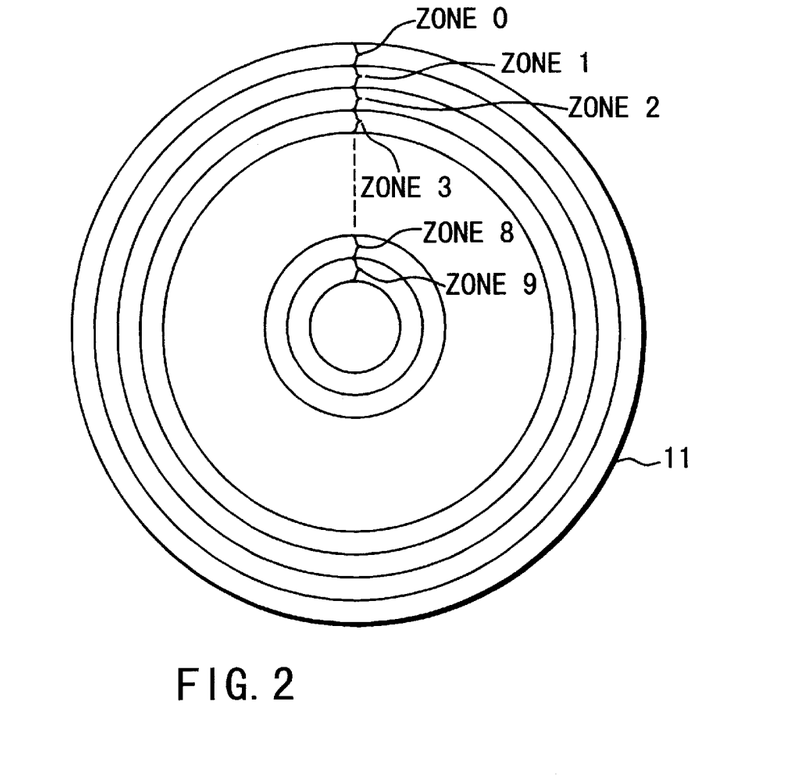
FIG. 2 is a diagram illustrating the format of the disks used in the HDD shown in FIG. 1.

As shown in FIG. 2, each disk 11 has a specific format, having a number of concentric tracks on either data-recording surface. Each track (also known as "cylinder") has servo areas. Recorded in each servo area is servo data. The servo data includes a track address and a servo burst data item. The track address identifies the track. The servo burst data item comprises a pattern for detecting a positional error that each head may have with respect to the track. The servo areas of each track, in which servo data is recorded, are equidistantly spaced apart in the circumferential direction of the disk 11. The corresponding servo areas of the tracks are aligned in the radial direction of the disk 11. User data areas are provided among the servo areas of each track. Each user area consists of a plurality of data sectors, as in most cases.

The format of each disk 11 is CDR (Constant Density Recording) format. In this format, the tracks form ten groups, which are called "zones 0 to 9," as is illustrated in FIG. 2. Each zone consists of a different number of data sectors. (Each zone consists of more data sectors than the next inner data sectors). In other words, the zones 0 to 9 differ in terms of data transfer rate (i.e., linear recording density). (Each zone has a data transfer rate higher than the next inner data sector.) Thus, the tracks of the same zone have the same data transfer rate.

A spindle motor (SPM) 13 rotates the disks 11. The heads 12 are attached to head moving mechanisms called "carriages 14." A voice coil motor (VCM) 15 drives the carriages 14. When the carriages 14 are driven, the heads 12 are moved along the radii of the disks 11.

The spindle motor 13 and the voice coil motor 15 are connected to a motor driver 16. The motor driver 16 supplies a control current to the spindle motor 13, driving the motor 13. It supplies a control current to the voice coil motor 15, too, thereby driving the motor 15. A CPU (microprocessor) 20 determines the values of the control currents (control values). The control values are supplied to the motor driver 16, in the form of digital data.

The heads 12 are connected to a head amplifier circuit 17 mounted on, for example, a flexible printed circuit board (FPC). The head amplifier circuit 17 switches one head to another, and supplies a write signal to the head selected or receives a read signal therefrom. The circuit 17 has a head amplifier 171 for amplifying the read signal (analog signal) generated by any head 12. The circuit 17 also has a write driver (not shown), which is designed to supply a write signal (write current) to any head 12 in accordance with the write data supplied from a read/write circuit 18.

The read/write circuit (also known as "read channel") 18 is designed to receive the read signal each head 12 has read from the disk 11, via the head amplifier circuit 17, and to decode the read signal, thereby reproducing the data recorded on the disk 11. The circuit 18 is also designed to encode a write signal into data, which is recorded on the disk 11. The circuit 18 has another function of extracting a servo burst data item from the servo data.

The data reproduced by the read/write circuit 18 is supplied to a servo circuit 19. The servo circuit 19 processes the data to accomplish servo process. More specifically, the servo circuit 19 performs three functions, i.e., timing-generating function, decoding function, and A/D converting function. The timing-generating function is to generate various timing signals from the data reproduced by the read/write circuit 18. The timing signals thus generated remain effective for the period that corresponds to a servo area. The decoding function is to extract a cylinder code from the servo data recorded in the servo area and decode the cylinder code. The A/D converting function is to convert the burst data (analog data) extracted by the read/write circuit 18, to digital data, and supplies the digital data to the CPU 20.

The CPU 20 is, for example, a one-chip microprocessor. The CPU 20 controls the other components of the HDD in accordance with the control program stored in a ROM 21. The CPU 20 causes any selected head 12 to move to a target position (i.e., a target track to access), on the basis of the cylinder code extracted from the servo data by the servo circuit 19 and the servo burst data item extracted by the read/write circuit 18. A seek operation and the positioning of the head 12 are thereby sequentially accomplished. To be more specific, the CPU 20 controls the motor driver 16, which drives the voice coil motor 15, whereby the seek operation is performed and the head 12 is positioned at the target track. Further, the CPU 20 controls a disk controller (HDC) 24, whereby read data and write data are transferred between the HDD and the host system through a host interface 26.

The CPU 20 measures the throughput performance of the HDD and predicts an error on the HDD on the basis of the throughput performance measured. More precisely, the CPU 20 measures the throughput performance in accordance with the program stored in the ROM 21. That is, the CPU 20 repeatedly measures the amount of time spent to read data respectively from three areas, each consisting of three zones 0 to 9 on the entire data-recording surface of each disk 11. (Hereinafter, the three areas will be referred to as "measured areas.") This amount of time, repeatedly measured, are used as data that represents the throughput performance of the HDD.

The CPU 20 starts measuring the throughput performance in this way, upon receiving a specific command (test command) supplied from the host system, as will be described in detail with reference to FIG. 4. Alternatively, the CPU 20 starts measuring the throughput performance, upon lapse of a prescribed time after it has received any command from the host system, as is illustrated in the flow chart of FIG. 5.

In addition to the ROM 21, a RAM (Random Access Memory) and an EEPROM (Electrically Erasable and Programmable Read Only Memory) 23 are connected to the CPU 20. These memories 22 and 23 have work areas for the CPU 20 and storage areas storing control parameters the CPU 20 uses.

Figure 3A:
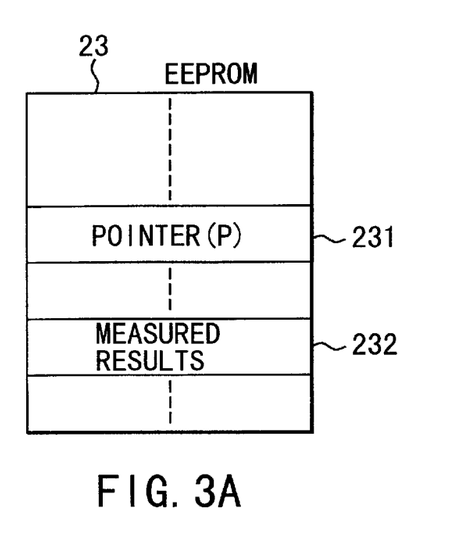
FIGS. 3A and 3B are diagrams representing the storage areas of the EEPROM incorporated in the HDD.

As shown in FIG. 3A, the EEPROM 23 has a pointer area 231 and a measured result area 232. The pointer area 231 is provided for storing a pointer P, which represents the first zone (zone number) included in each measured area. The measured result area 232 is provided for storing the periods measured for the measured areas. Number 0 identifying the zone 0 (P=0) is set in the pointer area 231, immediately before the HDD is delivered as a product from the factory.

Also connected to the CPU 20 is the HDC (Disk Controller) 24. The HDC 24 controls the transfer of data between itself and the host system, and the transfer of data between itself and the read/write circuit 18. Read data and write data are stored in the HDC 24, which operates as a cache. A buffer memory 25 and the host interface 26 are connected to the HDC 24. The host interface 26 is an interface between the HDC 24 and the host system. Hence, commands and data items are transferred between the HDC 24 and the host system through the host interface 26.

Also connected to the CPU 20 is a timer 27. The timer 27 starts measuring time every time the CPU 20 receives a command from the host system. Therefore, the CPU 20 can start measuring the throughput performance, upon lapse of the prescribed time after it has received any command from the host system, as is shown in the flow chart of FIG. 5.

(Monitoring of the Throughput Performance)

How the CPU 20 measures the throughput performance will be explained, with reference to the flow chart of FIG. 4.

Assume that the host system issues a test command. The test command is supplied to the CPU 20 through the host interface 26 and the HDC 24. The test command is a special command which demands that the CPU 20 measure the throughput performance to predict a trouble in the HDD.

First, the CPU 20 refers to the pointer P stored in the pointer area 231 of the EEPROM 23 and sets the value of the pointer P as the number (ZN) of the first zone of a measured area (Step S1). The CPU 20 also sets a head number (H) (Step S2). The head number (H) designates one head 12 opposing one data-recording surface of a disk 11.

The CPU 20 designates, for example, the three zones 0 to 2 provided on one data-recording surface of the disk 11, at which the head (H=0) 12 is provided. The zones 0 to 2 constitute a measured area from which the throughput performance is measured. In this instance, the first zone ZN (ZN=0) of the measured area is designated by the pointer P (P=0). The CPU 20 measures the throughput performance at the measured area (Step S3). To state more precisely, the CPU 20 causes the head 0 to read data from the measured area (i.e., zones 0 to 2), and the time required to read the data from this area is measured.

In the present embodiment, the zone 0 is considered as one next to the zone 9. Hence, the three zones designated when P=8 are zone 8, zone 9 and zone 0. Similarly, the three zones designated when P=9 are zone 9, zone 0 and zone 1.

Next, the throughput performance measured by the CPU 20 in Step S3 is temporarily stored in the measured result area (not shown) provided in the RAM 22 for the head H (i.e., head 0 in this instance) (Step S4). The CPU 20 determines whether or not the head number H identifies the last head 5 (Step S5). If NO in Step S5, the head number H is increased by one, thereby setting the next head number (Step S6). In other words, the CPU 20 switches the head to another. The operation then returns to Step S3. In Step S3, the CPU 20 causes the head 1 (=H+1=0+1) to read data from the measured area on the disk 11 (i.e., three consecutive zones, the first of which is zone P), and the time required to read the data from this area is measured. In Step S4, the throughput performance measured by the CPU 20 in Step S3 is temporarily stored in the measured result area (not shown) provided in the RAM 22 for the head H (i.e., head 1 in this instance).

The CPU 20 performs Steps S6, S3 and S4 until it determines in Step S5 that the head number H identifies the last head 5 (H=5). The head number H is 5 if the throughput performance has been measured on the measured areas (each consisting of three consecutive zones beginning with zone P) of all three disks 11. Then, the operation goes to Step S7, in which the CPU 20 stores the sum of the periods measured for the data-recording surfaces of the three disks 11, in the measured result area 232 of the EEPROM 23.

Thereafter, the CPU 20 determines whether the point P (stored in the pointer area 231), which indicates the number of the first zone of the measured area, is 9 or not (Step S8). In other words, the CPU 20 determines whether or not the pointer P indicates the last zone 9 on the disk 11. If NO in Step S8, the pointer P is increased by one (Step S9). Namely, the pointer P (=9) is changed to 0, designating the first zone 0 of the disk 11. If YES in Step S8, the pointer P is changed to 0 (Step S10). Thus, the throughput performance is measured for the three zones beginning with the zone next to the zone 0, namely the zones 1, 2 and 3 which are designated as the measured area now. Upon changing the pointer P to 0 in Step S9 or Step S10, the CPU 20 stops measuring the throughput performance, though the test command supplied from the host system remains effective. Then, the CPU 20 starts measuring other values which the CPU 20 needs to acquire, along with the throughput performance, to predict an error in the HDD. When the CPU 20 finishes measuring these values, it starts the timer 27. The timer 27 is used to measure the time that lapses after the CPU 20 has received any command from the host system. The timer 27 is also started when the CPU 20 finishes performing any other operation (e.g., reading and writing of data) it has initiated in response to a command other than the test command.

Figure 6:
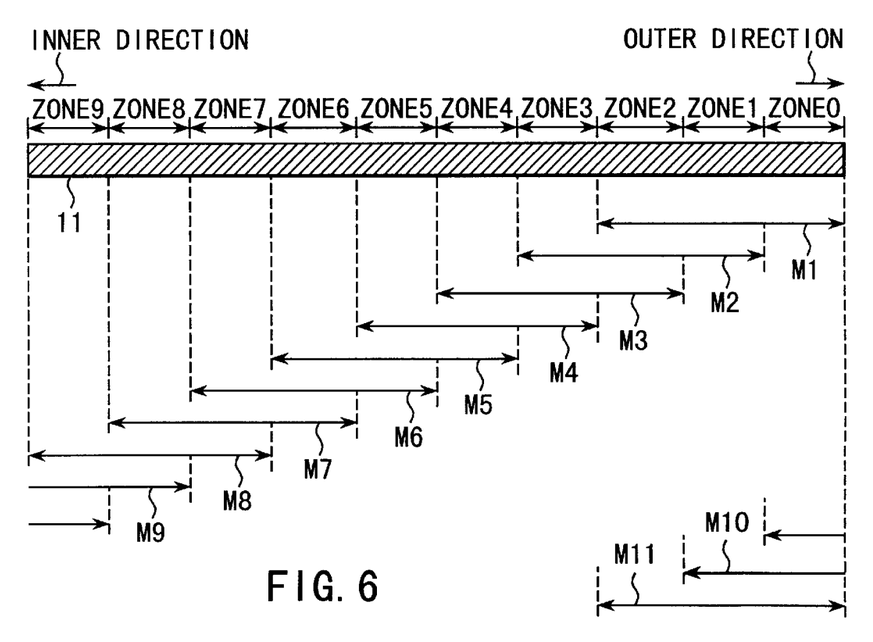
FIGS. 6 and 8 are diagrams explaining how the data-reading areas are switched from one to the other while measuring the throughput performance.

As described above, the measured area consisting of three consecutive zones of each disk 11 is changed by one zone when the CPU 20 finishes measuring the throughput performance for the measured area. The time required for measuring the throughput performance for one measured area is short because the measured area consists of only three zones. More specifically, as shown in FIG. 6, the CPU 20 measures the throughput performance for ten three-zone measured areas, which begin with the zones 0 to 9, respectively. In other words, data is read from each zone of the disk 11 three times. That is, data is read three times from each data-recording surface of the disk 11. Hence, the throughput performance can be reliably measured from any measured area (consisting of three consecutive zones), while the time required for measuring the throughput performance for each measured area is minimized.

Since the measured area is changed by one zone when the CPU 20 finishes measuring the throughput performance for the measured area, data is continuously read from the same zone three times to measure the throughput performance. This makes it possible to effectively detect a decrease in the throughput performance of the HDD, which has resulted from, for example, an abrupt increase in the number of defects in the same zone and which may result in an error on the HDD.

Figure 4:
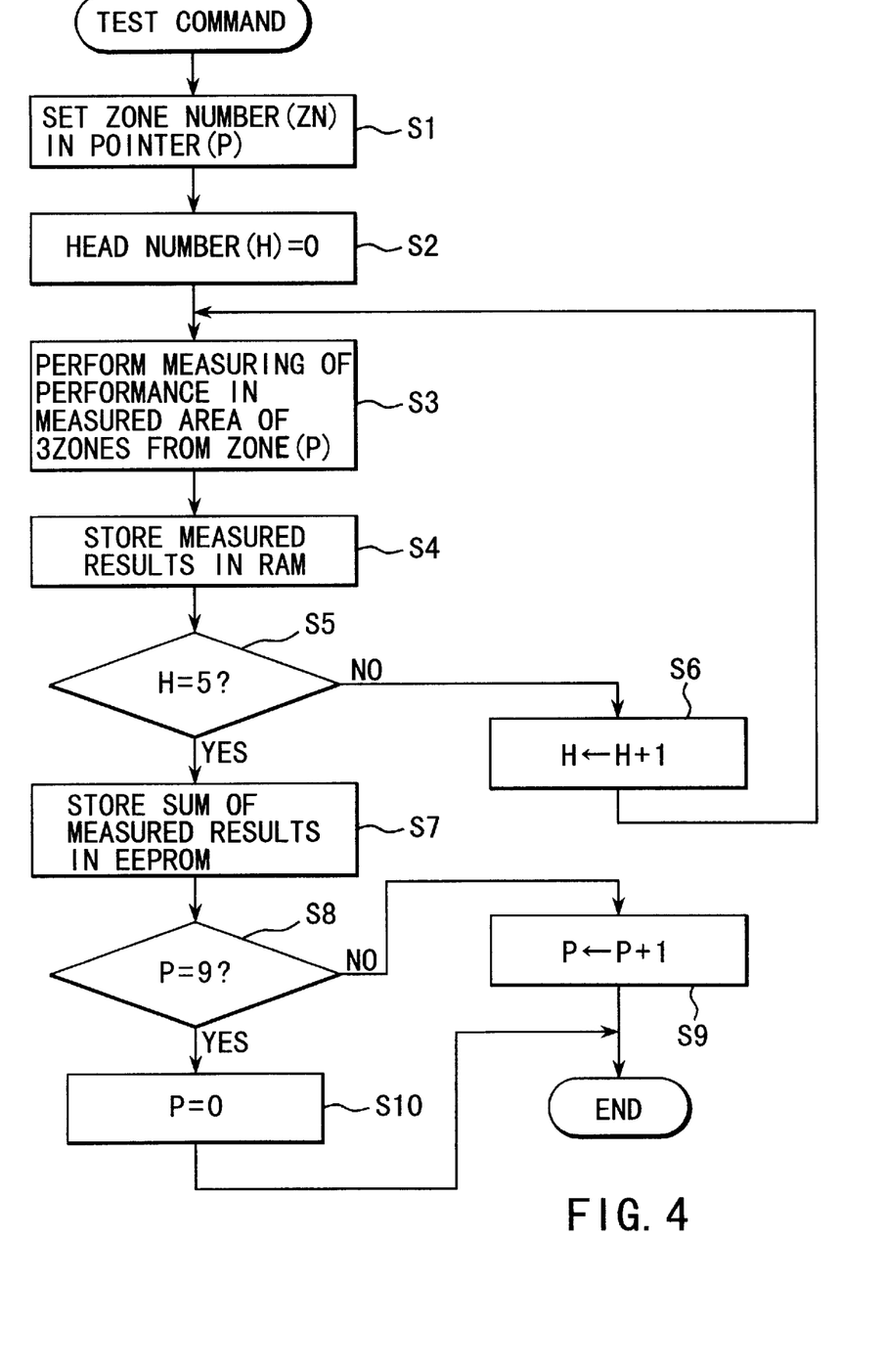
FIG. 4 is a flow chart explaining how the system measures the throughput performance of the HDD.

In the present embodiment, the CPU 20 starts measuring the throughput performance as is shown in FIG. 4, when timer 27 reaches a prescribed count after the HDD has received any command (including the test command) from the host system.

Figure 5:
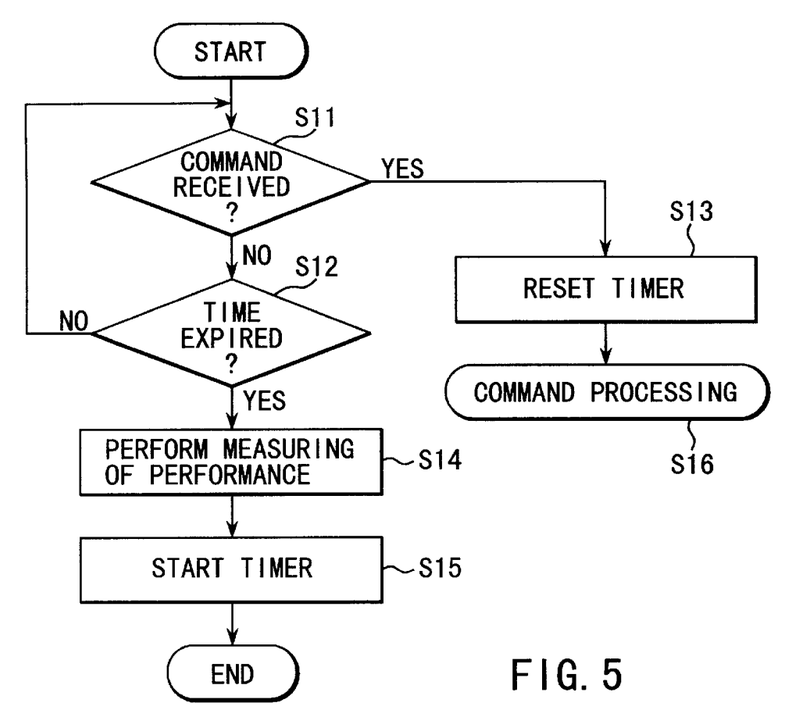
FIG. 5 is a flow chart explaining how the timer provided in the system operates while measuring the throughput performance.

Assume that the CPU 20 has started the timer 27. Then, the CPU 20 determines whether or not the HDD receives a command from the host system (Step S11). If YES, that is, if the HDD has received a command, the CPU 20 resets the timer 27 (Step S12) and performs a process in response to the command (Steps S16). If NO, that is, if the HDD has received no command, the CPU 20 determines whether or not the timer 27 has reached a prescribed count (Step S12). If NO in Step S12, that is, if the HDD receives no command even after the timer 27 has reached the prescribed count, the CPU 20 measures the throughput performance (Step S14) in such a manner as is shown in FIG. 4. Upon measuring throughput performance, the CPU 20 starts the timer 27 again (Step S15). If the HDD receives no command from the host system even after the timer 27 has been started again and has reached the prescribed count, the CPU 20 will automatically measure the throughput performance again, during the so-called "automatic off-line test."

To receive data representing the possibility of an error on the HDD, the host system issues a specific command (test command). In response to the specific command, the CPU 20 determine whether or not an error has occurred in the HDD, on the basis of the results of the test carried out in the HDD (i.e., the various values measured). To be more specific, the CPU 20 compares the time actually spent to read data from each measured area of the disk 11, with the reference time prescribed for the measured area. The reference time is a theoretical value calculated for the measured area or a value measured therefor immediately before the HDD is delivered from the factory. The CPU 20 determines that a trouble is likely to occur soon in the HDD if the time spent to read data from any one of the measured areas is longer than the reference time. The data representing the error thus predicted is supplied from the HDD to the host system.

(First Modification)

A first modification of the embodiment of the invention will be described.

In the embodiment described above, the measured area (consisting of three consecutive zones) of each disk 11 is changed by one zone every time the CPU 20 finishes measuring the throughput performance for the measured area. The throughput performance is therefore measured three times for each zone on the disk 11 upon completion of the reading of data from the data-recording surface of the disk 11. Nonetheless, the present invention is not limited to this method of measuring the throughput performance of HDDS.

Figure 7:
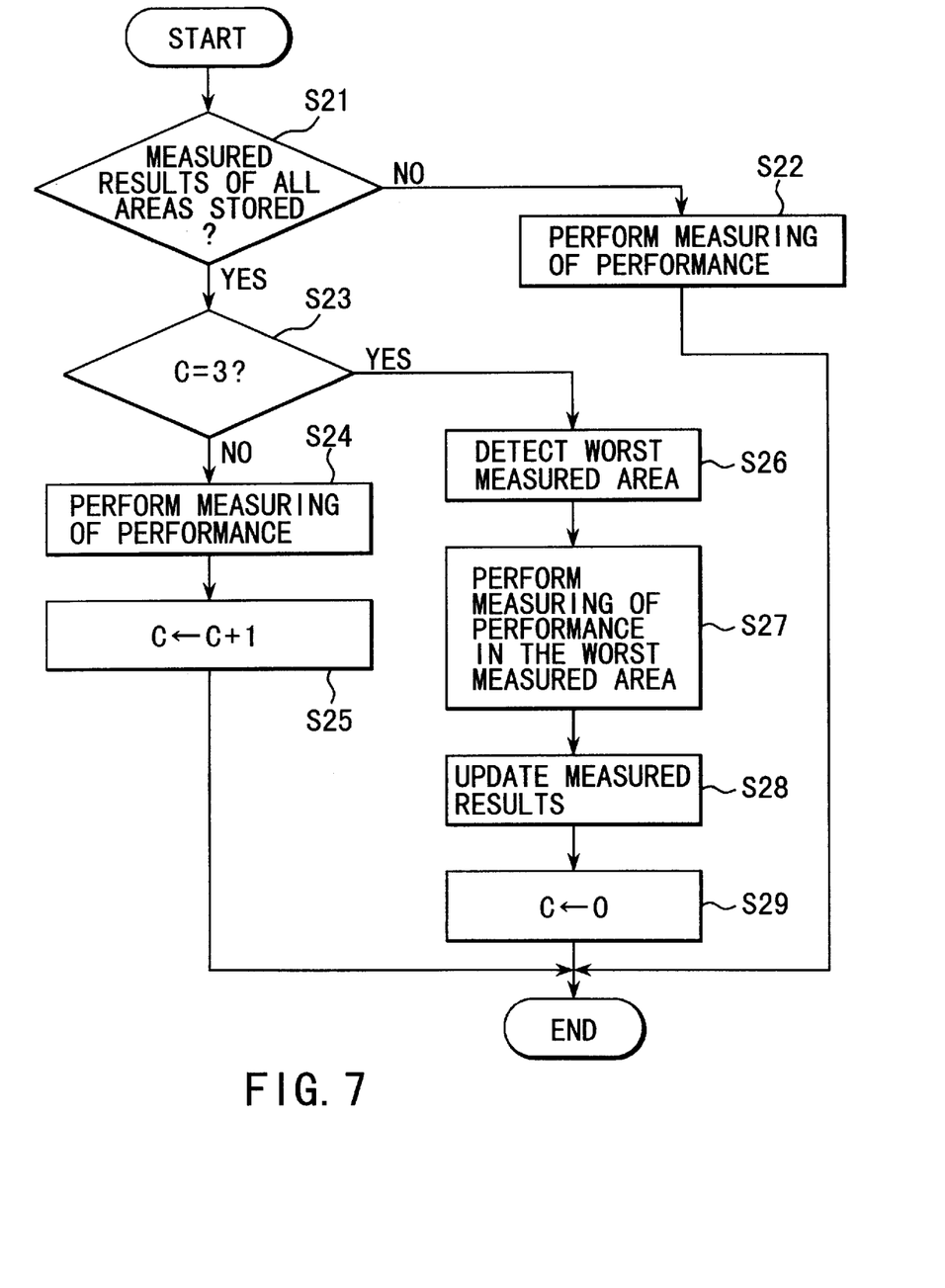
FIG. 7 is a flow chart explaining how a first modified system measures the throughput performance of the HDD.
Figure 8:
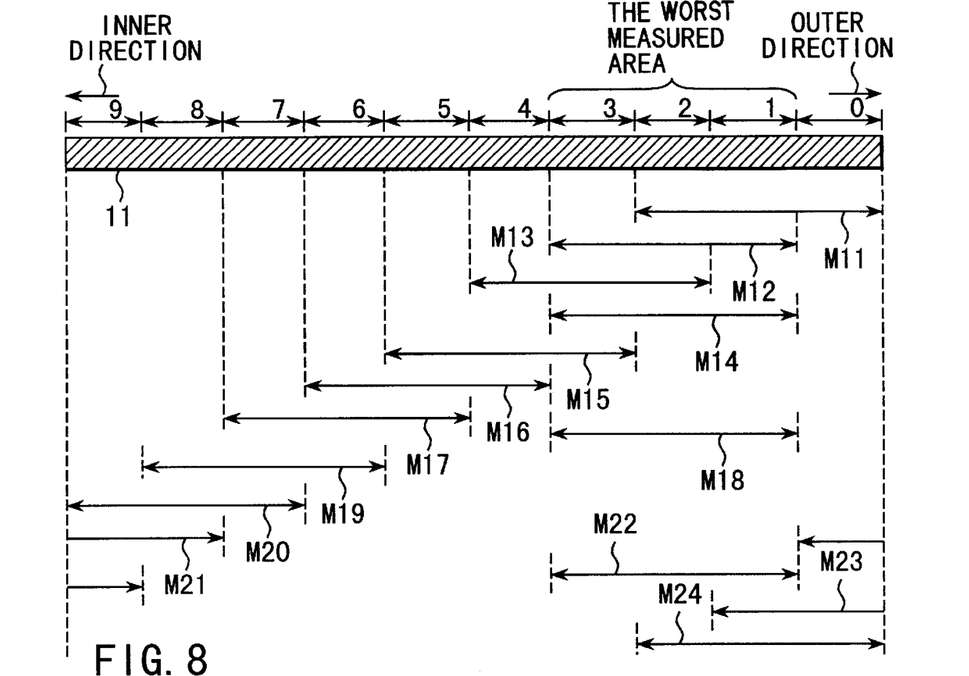

A first modification of the embodiment will be described, with reference to FIGS. 7 and 8.

In the first modification, too, the throughput performance of the HDD is measured for ten measured areas provided on either data-recording surface of each disk 11. As in the embodiment, the ten measured areas consist of three consecutive zones each, beginning with the zones 0 to 9, respectively. The throughput performances measured for the ten measured areas are recorded in the measured result area 232 of the EEPROM 23. The measured area for which the lowest throughput performance has been measured (the worst measured area) is determined. The throughput performance is measured more often for the worst measured area than for any other measured area.

Figure 3B:
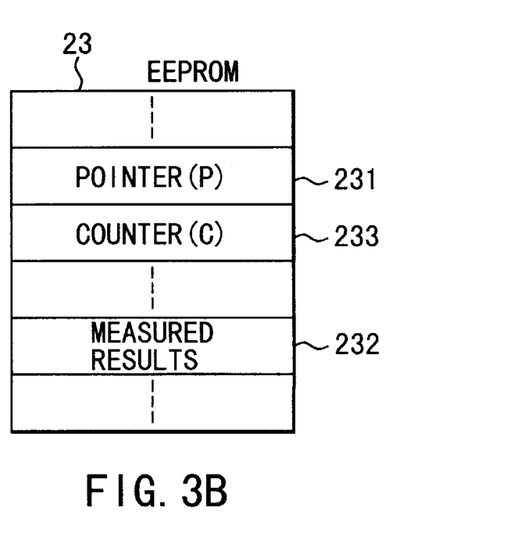

As shown in FIG. 3B, the EEPROM 23 has a counter area 233. The data representing how many times the throughput performance has been measured for the worst measured area is stored in the counter area 233. More precisely, a counter value C, representing the number of times the throughput performance has been measured, changes each time the pointer P changes as shown in FIG. 4. It should be noted that "0" is set as initial value for C in the counter area 233 immediately before the HDD is delivered from the factory.

In response to a test command supplied from the host system, the CPU 20 refers to the measured result area 232 of the EEPROM 23. It determines whether or not the throughput performance measured for all ten measured areas beginning with the zones 0 to 9, respectively, have been stored in the measured result area 232 (Step S21). In this regard, a flag may be stored in the EEPROM and set when the throughput performance is measured for the tenth measured area, i.e., the last measured area. If so, the CPU 20 only need to refer to this flag to determine whether the throughput performance measured for all ten measured areas have been stored in the measured result area 232.

If NO in Step S21, that is, if the throughput performance measured for all ten measured areas have not been stored, the CPU 20 keeps measuring the throughput performance as is shown in the flow chart of FIG. 4 (Step S22). If YES in Step S21, the CPU 20 determines whether the counter value C stored in the counter area 233 is 3 (three) or not. If NO in Step S22, the CPU 20 determines that it is not the time to measure the throughput performance for the worst measured area. In this case, the CPU 20 continues to measure the throughput performance as is shown in the flow chart of FIG. 4 (Step S24). Then, the CPU 20 increases the count value C by one (Step S25), completing a sequence of operations.

The counter value C has an initial value of 0 as indicated above. Thus, Step S24 and S25 are repeated until the value C changes to 3 after the throughput performance has been measured for all ten measured areas (beginning with zones 0 to 9, respectively) for the first time. Specifically, Step S24 and Step 25 are carried out three times, whereby the throughput performance is measured for the three 3-zone measured areas which begin with zone 0, zone 1 and zone 2, respectively.

If YES in Step S23, that is, if the counter value C is 3, the operation goes to Step S26. In Step S26, the CPU 20 detects the worst measured area on either data-recording surface of each of the three disks 11, on the basis of the throughput performances measured for the ten measured areas and recorded in the measured result area 232. The CPU 20 then measures the throughput performance for the worst measured areas detected in Step S26 (Step S27). Assume that the worst measured areas detected are the three which start with zone 1, zone 2 and zone 3, respectively, and that the throughput performance is measured for these worst measured areas in the fourteenth measuring as is shown in FIG. 8. In this case, the measuring of throughput performance effected in Step 27 differs from the method shown in the flow chart of FIG. 4 in that the pointer P in the pointer area 231 is neither referred to nor changed.

After measuring the throughput performances for all measured areas in Step S27, the CPU 20 updates the throughput performances recorded in the measured result area 232 to the values measured in Step 27 (Step 28). Next, the CPU 20 initializes the counter value C to 0 (Step S29). Thus, the CPU 20 completes a sequence of measuring the throughput performance of the HDD.

In the first modification of the embodiment described above, the throughput performance is first measured for the ten 3-zone measured areas beginning with zone 0 to 9, respectively. Then, each measured area is changed by one zone, three times, as is illustrated in FIG. 8. As a result, the throughput performance is measured for the three worst measured areas detected at this time (i.e., the three zones starting with zones 1 to 3, respectively, in the abovementioned instance). Thus, the throughput performance is measured more times for the worst measured area than for any other measured area. This enhances the accuracy of predicting an error on the HDD. In particular, if a specific value (e.g., error rate) which may impair the throughput performance of the HDD is measured for the worst measured areas in Step 27, an error on the HDD can be predicted with a higher accuracy, while minimizing the scale of the measuring process.

(Second Modification)

Figure 9:
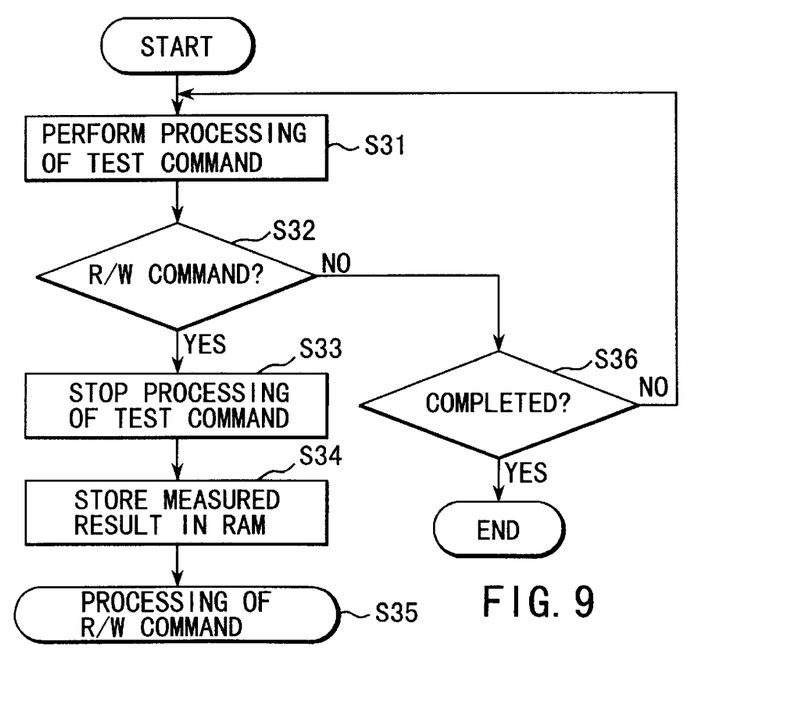
FIG. 9 is a flow chart explaining how a second modified system measures the throughput performance of the HDD.

A second modification of the embodiment of the invention will be described, with reference to the flow chart of FIG. 9.

In the second modification, the CPU 20 operates as will be described below when it receives a read/write command from the host system while executing the test command received from the host system. More precisely, the CPU 20 performs the test command (Step S31). While executing the test command, or while measuring the throughput performance, the CPU 20 determines whether or not a read/write command has been supplied to it (Step S32). If YES in Step 32, the CPU 20 stops executing the test command (Step S33). The results of the processing effected in accordance with the test command, i.e., the throughput performance measured for any measured area, are temporarily stored into the RAM 22 (Step S34). Alternatively, the results of the processing may be stored into the EEPROM 23. Then, the CPU 20 performs the read/write command supplied from the host system (Step S35).

If NO in Step S32, that is, if no read/write command has been supplied to it, the CPU 20 determines whether the process of measuring of throughput performance has been completed or not (Step S36). If YES, the operation ends. If NO, the operation returns to Step S31.

In the embodiment, each measured area consists of three zones. The present invention is not limited to this technical point. Rather, each measured area may consists of any other number of zones (e.g., four zones), provided the measured area is a part of the either data-recording surface of any disk 11 provided. In the embodiment, each measured area overlaps both the preceding one and the following one. Nevertheless, each measured area may overlap the preceding one only. Further, each measured area may overlap neither the preceding one nor the following one. In other words, the measured areas may be spaced apart from one another. If so, each measured area may be constituted by one zone. In this case, however, a longer time is required to detect a decrease in the throughput performance, which has resulted from, for example, an abrupt increase of defects in the same zone and which would cause an error on the HDD.

Furthermore, the measured areas may be defined in units of heads, instead of in units of zones as in the above embodiment. For example, one measured area may be defined for each head. Moreover, the measured areas may be defined in units of heads and also in units of zones. Still further, zones defined by dividing either data-recording surface of any disk by n (n is an integer greater 2), each composed of tracks which may have different recording densities, may replace the zones of the CDR format (i.e., zones each composed of tracks having the same recording density).

In the embodiment described above, the throughput performance measured and the pointer P (and the counter value C) are all stored in the EEPROM 23 (a nonvolatile memory). Nonetheless, the pointer P (and the counter value C) may be stored in the RAM 22 (a nonvolatile memory). If so, the pointer P (and the counter value C) is initialized when the power switch of the HDD is turned off. When the power switch is turned on, the measuring of throughput performance cannot be resumed at the measured area for which throughput performance was measured at the time of turning off the power switch. Inevitably, the measuring is resumed at the first measured area that starts with zone 0. Even in this case, an error on the HDD can be predicted with high accuracy by measuring throughput performance more often for the worst measured area than for any other measured area, as in the first and second modifications described above.

At least the throughput performance measured may be stored in a nonvolatile storage medium other than the EEPROM 23. For example, the throughput performance may be a prescribed area on the disk 11. The user will not be able to read from or write to the prescribed area.

The above embodiment, i.e., a system for measuring throughput performance, is designed for use in magnetic disk drives. Nevertheless, the present invention can be applied to any disk storage drive that has at least one disk on which data can be recorded and from which data can be reproduced. Thus, the invention can be applied not only to a magnetic disk drive but also to an optical disk drive.

As has been described, each data-recording surface of a disk is divided into a plurality of zones, and throughput performance is measured for a plurality of measured areas, each consisting of at least one zone, by changing each measured area. Therefore, the time spent to measure the throughput performance by one measured area is minimized. In addition, the throughput performance may be repeatedly measured for all measured areas, thereby enhancing the accuracy of predicting an error on a disk storage drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A system for monitoring throughput performance of a disk storage drive which has a disk used as a storage medium and having a data-recording surface, said system comprising:

pointer means for storing a pointer designating one of measured areas provided on the data-recording surface of the disk, for which the throughput performance is to be measured;

measuring means for measuring the throughput performance for the measured area designated by the pointer stored in the pointer means;

storing means for storing the throughput performance measured for the measured area by the measuring means; and management means for updating the pointer every time the measuring means measures throughput performance, thereby to designate measured areas sequentially until throughput performance is measured for the entire data-recording surface of the disk.

2. The system according to claim 1, wherein said management means has means for dividing the data-recording surface of the disk into a plurality of zones, thereby defining a measured area consisting of at least one zones, for which throughput performance is measured once, and for storing in said pointer means the pointer which designates the measured area.

3. The system according to claim 1, wherein said measuring means and said management means are activated by a specific command supplied from a host system for accessing the disk storage drive, and said measuring means reads data from the measured area designated by said pointer means, in response to the specific command, measures time spent to read the data therefrom, and stores the time in said storing means as throughput performance measured for the measured area.

4. The system according to claim 1, wherein said measuring means stops measuring throughput performance after having measured the throughput performance for the measured area designated by the pointer, upon receiving from a host system a command which instructs a read/write access to the disk, and stores the throughput performance measured thus far into said storing means.

5. The system according to claim 1, in which said measuring means and said management means are activated by a specific command supplied from a host system for accessing the disk storage drive, and which further comprises timer means for measuring time elapsing from the receipt of the specific command and control means for activating said measuring means and said management means upon lapse of a prescribed period from the receipt of the last specific command.

6. A system for monitoring throughput performance of a disk storage drive which has a disk used as a storage medium and having a data-recording surface, said system comprising:

> pointer means for storing a pointer designating a measured area on the data-recording surface of the disk, for which the throughput performance is to be measured;
>
> storing means for storing throughput performance measured for the measured area;
>
> measuring means for measuring the throughput performances for the measured areas designated by the pointer stored in the pointer means, storing the throughput performances thus measured into said storing means, reading the throughput performances stored in said storing means, designating the worst of the measured areas on the basis of the throughput performances stored in said storing means, and measuring the throughput performance for the worst measured area thus designated; and
>
> management means for updating the pointer every time the measuring means measures throughput performance, thereby to designate measured areas sequentially until throughput performance is measured for the entire data-recording surface of the disk.

7. The system according to claim 6, wherein said measuring means has means for measuring the throughput performance for the worst measured area, thereby to predict a trouble which results in a decrease of the throughput performance of the disk storage drive.

8. The system according to claim 6, wherein said management means has means for dividing the data-recording surface of the disk into a plurality of zones, thereby defining measured areas each consisting of at least one zones, for which throughput performance is measured once, and for storing in said pointer means the pointer which designates any one of the measured areas that has been selected.

9. The system according to claim 6, wherein said measuring means and said management means are activated by a specific command supplied from a host system for accessing the disk storage drive, and said measuring means reads data from the measured area designated by said pointer means, in response to the specific command, measures time spent to read the data therefrom, and stores the time in said storing means as throughput performance measured for the measured area.

10. The system according to claim 6, wherein said measuring means stops measuring throughput performance after having measured the throughput performance for the measured area designated by the pointer, upon receiving from a host system a command which instructs a read/write access to the disk, and stores the throughput performance measured thus far into said storing means.

11. The system according to claim 6, in which said measuring means and said management means are activated by a specific command supplied from a host system for accessing the disk storage drive, and which further comprises timer means for measuring time elapsing from the receipt of the specific command and control means for activating said measuring means and said management means upon lapse of a prescribed period from the receipt of the last specific command.

12. The system according to claim 6, wherein said measuring means measures the throughput performance for the worst measured area and for any measured area designated by the pointer, at predetermined different rates.

13. A method of monitoring throughput performance of a disk storage drive which has a disk used as a storage medium and having a data-recording surface, said method comprising the steps of:

> measuring the throughput performance for one of measured areas provided on the data-recording surface and designated by a pointer stored in pointer means, in response to a specific command supplied from a host system for accessing the disk storage drive;
>
> storing the throughput performance measured for the measured area into storing means; and
>
> updating the pointer every time the measuring means measures throughput performance, thereby to designate measured areas sequentially until throughput performance is measured for the entire data-recording surface of the disk.

14. The method according to claim 13, wherein the data-recording surface of the disk is divided into a plurality of zones, thereby defining a measured area consisting of at least one zones, for which throughput performance is measured once, and the pointer which designates the measured area is stored into said pointer means.

15. A method of monitoring throughput performance of a disk storage drive which has a disk used as a storage medium and having a data-recording surface, said method comprising the steps of:

> performing a first measuring process of measuring the throughput performance for measured areas provided on the data-recording surface and sequentially designated by a pointer stored in pointer means, in response to a specific command supplied from a host system for accessing the disk storage drive;
>
> storing the throughput performances measured for the measured areas in the first measuring process, into storing means;
>
> designating the worst of the measured areas on the basis of the throughput performances stored in said storing means, and performing a second measuring process of measuring the throughput performance for the worst measured area thus designated;
>
> performing one of the first and second measuring processes such that the number of times the second measuring process is repeated is at a predetermined ratio to the number of times the first measuring process is repeated; and
>
> updating the pointer every time the measuring means measures throughput performance, thereby to designate measured areas sequentially until throughput performance is measured for the entire data-recording surface of the disk.

16. A method of monitoring throughput performance of a disk storage drive which has a disk used as a storage medium and having a data-recording surface, said method comprising the steps of:

> measuring the throughput performance for measured areas provided on the data-recording surface and sequentially designated by a pointer stored in pointer means, in response to a specific command supplied from a host system for accessing the disk storage drive;

storing the throughput performances measured for the measured areas, into storing means;

stopping the measuring of throughput performance after the throughput performance has been measured for the measured area designated by the pointer, upon receiving from a host system a command which instructs a read/write access to the disk;

storing the throughput performance measured thus far, into said storing means; and updating the pointer every time the measuring means measures throughput performance, thereby to designate measured areas sequentially until throughput performance is measured for the entire data-recording surface of the disk.

* * * * *